United States Patent
Guan et al.

(10) Patent No.: US 7,242,870 B2
(45) Date of Patent: Jul. 10, 2007

(54) WAVELENGTH DIVISION MULTIPLEXING SYSTEM

(75) Inventors: Ning Guan, Sakura (JP); Katsuhiro Takenaga, Sakura (JP); Kuniharu Himeno, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/036,981

(22) Filed: Jan. 19, 2005

(65) Prior Publication Data

US 2005/0157995 A1    Jul. 21, 2005

(30) Foreign Application Priority Data

Jan. 21, 2004    (JP)    ............... 2004-013075

(51) Int. Cl.
*H04B 10/00*    (2006.01)
(52) U.S. Cl. .................. 398/180; 398/172; 398/97
(58) Field of Classification Search ........ 398/142–143, 398/173–181, 97
See application file for complete search history.

(56) References Cited

U.S. PATENT DOCUMENTS 5,509,101 A * 4/1996 Gilliland et al. ............ 385/142
6,633,715 B2 * 10/2003 Knudsen et al. ............ 385/127
6,944,404 B2 * 9/2005 Lange et al. ................ 398/138

OTHER PUBLICATIONS

N. Shibata, et al, "Refractive-indexdispersion for $GeO_2$-, $P_2O_5$- and $B_2O_3$-doped silica glasses in optical fibers"; Trans. IECE Japan, vol. E65; pp. 166-172; 1982.
R. Olshansky, et al; "Pulse Broadening n Graded-index Optical Fibes"; Appl. Opt., vol. 15; pp. 483-491; 1976.
J.W. Fleming; "Material dispersion in lightguide glasses"; Electron Lett., vol. 14; pp. 326-328; 1978.
K. Okamoto; "Comparison of calculated and measured impulse responses of optical fibers"; Appl. Opt., vol. 18; pp. 2199-2206; 1979.

* cited by examiner

*Primary Examiner*—Agustin Bello
(74) *Attorney, Agent, or Firm*—Sughrue Mion, PLLC

(57) ABSTRACT

A wavelength division multiplexing system includes a wavelength division multiplexing transmission path including a multimode optical fiber that is codoped with germanium and fluorine. The wavelength division multiplexing system may further include a multiplexer and a demultiplexer, in which the multiplexer and the demultiplexer are coupled via the multimode optical fiber. The wavelength division multiplexing system may further include a first multiplexer/demultiplexer and a second multiplexer/demultiplexer, in which the first multiplexer/demultiplexer and the second multiplexer/demultiplexer are coupled via the multimode optical fiber so that a bidirectional wavelength division multiplexing is enabled.

13 Claims, 3 Drawing Sheets

WAVELENGTH DIVISION MULTIPLEXING SYSTEM

BACKGROUND OF THE INVENTION

1. Field of the Invention

The present invention relates to a wavelength division multiplexing system using a multimode optical fiber. More particularly, the present invention relates to a wavelength division multiplexing system using a multimode optical fiber that exhibits a high transmission bandwidth in a wide wavelength range, which realizes a wavelength division multiplexing system using a multimode optical fiber which has not been possible previously.

Priority is claimed from Japanese Patent Application No. 2004-13075, filed Jan. 21, 2004, the content of which is incorporated herein by reference.

2. Description of Related Art

Multimode optical fibers (MMFs), such as GI (graded index) fibers, which have a large core radius and a high numerical aperture (NA), have been widely used as transmission paths in optical local area networks (LANs). Driven by a need for a faster LAN, profiles of conventional GI fibers are controlled very precisely, and further improvement in performance seems almost impossible at present. In order to increase a transmission bandwidth (hereinafter referred to as "bandwidth") of multimode optical fibers having a wider transmission bandwidth than those currently available, the use of wavelength division multiplexing (WDM) has been desired.

However, an optimal profile of GI fibers is dependent on wavelength, and GI fibers that are optimized for a certain wavelength are not suited for wavelength division multiplexing since such fibers exhibit a very limited bandwidth at wavelengths other than the optimal wavelength. FIG. 1 shows wavelength characteristics of 50/125 μm fibers, each optimized for a wavelength $\lambda_0$ of 850 nm or 1300 nm, and having a maximum relative refractive index difference $\Delta$ of 0.01 and a core radius "a" of 25 μm in the overfilled-launch (OFL) bandwidth (see IEC 60793-1-49 Specification). As shown in the graph, the bandwidths drop sharply as wavelengths departs from the optimal wavelengths.

For calculation in the example shown in this graph and other examples, values of material dispersion indices of pure silica and germanium-doped silica discussed in N. Shibata and T. Edahiro, "Refractive-index dispersion for $GeO_2$—, $P_2O_5$— and $B_2O_3$-doped silica glasses in optical fibers," *Trans. IECE Japan*, vol. E65, pp. 166-172, 1982, were used, and the value of a material dispersion index of fluorine-doped silica discussed in J. W. Fleming, "Material Dispersion in Lightguide Glasses," *Electron Lett.*, vol. 14, pp. 326-328, 1978 was used, and RMS spectrum range of incident light was assumed to be 0.35 nm. Bandwidths were calculated based on group delays of each mode calculated from the profiles (see K. Okamoto, "Comparison of Calculated and Measured Impulse Responses of Optical Fibers," *Appl. Opt.*, vol. 18, pp. 2199-2206, 1979).

SUMMARY OF THE INVENTION

The present invention was conceived in view of the above-mentioned background, and an object thereof is to provide a wavelength division multiplexing system that enables wavelength division multiplexing using a multimode optical fiber.

In order to achieve the above-mentioned object, the present invention provides a wavelength division multiplexing system including a wavelength division multiplexing transmission path including a multimode optical fiber that is codoped with germanium and fluorine.

In the wavelength division multiplexing system of the present invention, the multimode optical fiber can provide an overfilled-launch bandwidth of 1.5 GHz·km or higher for a signal transmitted therethrough at any wavelength between approximately 720 nm and approximately 1400 nm.

Furthermore, the multimode optical fiber can provide an overfilled-launch bandwidth of 2.5 GHz·km or higher for a signal transmitted therethrough at any wavelength between approximately 720 nm and approximately 1400 nm.

Still further, the multimode optical fiber can provide an overfilled-launch bandwidth of 1.5 GHz·km or higher or of 2.5 GHz·km or higher for a signal transmitted therethrough at any wavelength within a wavelength range of approximately 500 nm-700 nm.

The wavelength division multiplexing system of the present invention may further include a multiplexer and a demultiplexer, in which the multiplexer and the demultiplexer are coupled using the multimode optical fiber.

Alternatively, the wavelength division multiplexing system of the present invention may further include a first multiplexer/demultiplexer and a second multiplexer/demultiplexer, in which the first multiplexer/demultiplexer and the second multiplexer/demultiplexer are coupled using the multimode optical fiber so that a bidirectional wavelength division multiplexing is enabled.

The wavelength division multiplexing system of the present invention may be used for coarse wavelength division multiplexing with a wavelength spacing of 20 nm or greater.

In the wavelength division multiplexing system of the present invention, the multimode optical fiber may have a maximum relative refractive index $\Delta$ of between 0.007 and 0.015, and a core radius of between 20 μm and 30 μm.

In the wavelength division multiplexing system of the present invention, the multimode optical fiber may have a maximum relative refractive index $\Delta$ of between 0.015 and 0.025, and a core radius of between 30 μm and 35 μm.

A multimode optical fiber that is codoped with germanium and fluorine is used as a wavelength division multiplexing transmission path in the wavelength division multiplexing system of the present invention, which enables a wavelength division multiplexing system using a multimode optical fiber which has not been possible previously. Thus, the transmission rate of a multimode optical fiber can be significantly increased.

BRIEF DESCRIPTION OF THE DRAWINGS

These and other features, aspects, and advantages of the present invention will become better understood with reference to the following description and accompanying drawings, which should not be read to limit the invention in any way, in which.

DETAILED DESCRIPTION OF THE INVENTION

Hereafter, various embodiments of the present invention will be described with reference to the drawings.

Figure 1:
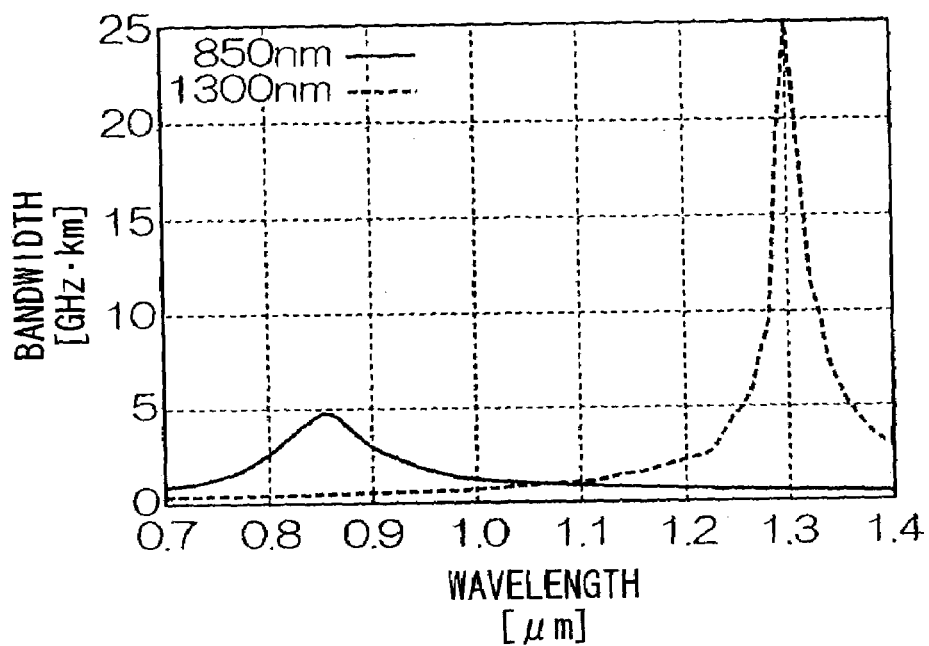
FIG. 1 is a graph of overfilled-launch (OFL) bandwidth versus wavelength of conventional GI multimode optical fibers.
Figure 2:
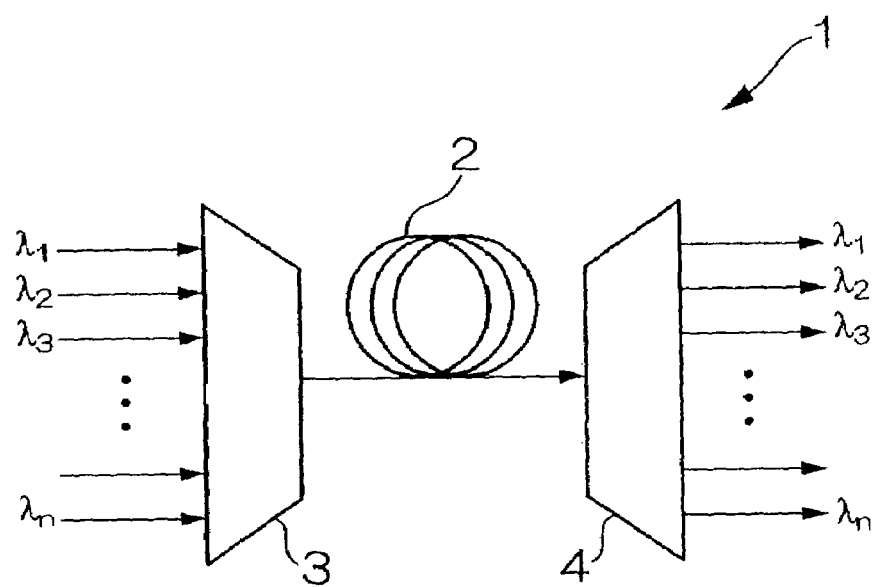
FIG. 2 is a schematic diagram of an exemplary wavelength division multiplexing system according to the present invention.

FIG. 2 is a schematic diagram illustrating a wavelength division multiplexing system according to the first embodiment of the present invention. A wavelength division multiplexing system 1 includes a multiplexer (MUX) 3 and a demultiplexer (DEMUX) 4 that are coupled via a multimode optical fiber 2. In wavelength division multiplexing system 1, after optical signals with various wavelengths $\lambda_1$, $\lambda_2$, ..., $\lambda_n$ are multiplexed by the multiplexer 3, the multiplexed signal is transmitted through the multimode optical fiber 2 and is demultiplexed by the demultiplexer 4.

Figure 6:
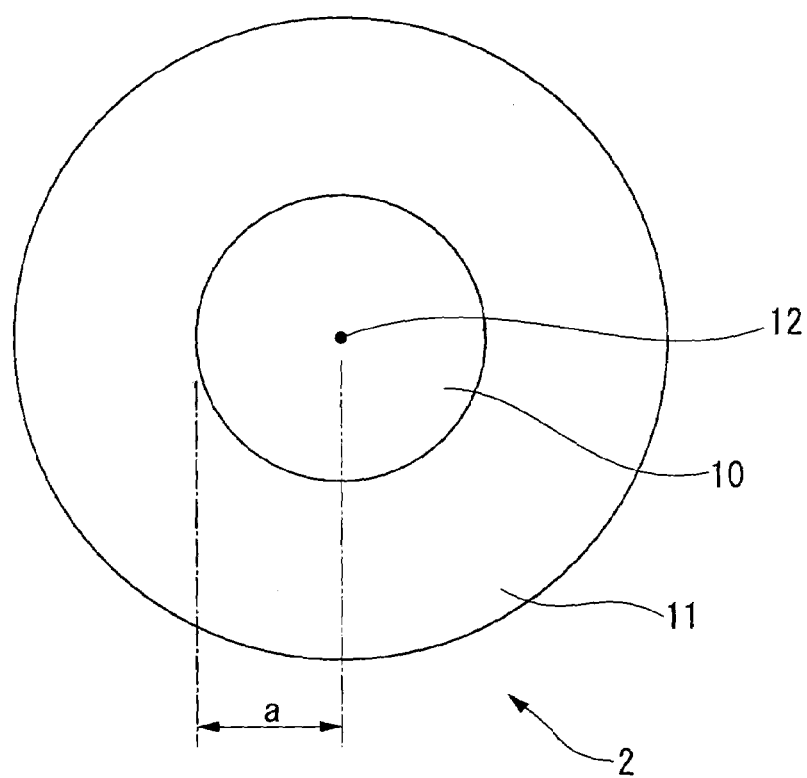
FIG. 6 is a cross-sectional view of an exemplary multimode optical fiber used in a wavelength division multiplexing system according to the present invention.

FIG. 6 is a cross-sectional view of an example of a multimode optical fiber used in the wavelength division multiplexing system according to the present invention. The multimode optical fiber 2 used in the wavelength division multiplexing system 1 of the present invention includes a core 10 made of silica-based glass that is codoped with germanium and fluorine and a cladding 11 made of silica glass or fluorine-doped silica glass that is disposed around the outer periphery of the core 10. The multimode optical fiber 2 exhibits a high OFL in a wide wavelength region so that a wavelength division multiplexing is enabled, and the multimode optical fiber 2 preferably exhibits an OFL bandwidth of 1.5 GHz·km or higher, and more preferably exhibits an OFL bandwidth of 2.5 GHz·km or higher at a given channel within a wavelength region between 720 nm and 1400 nm.

An example of the multimode optical fiber 2 includes, for example, an optical fiber that exhibits a refractive index profile expressed by Equation (1) described below. The core of such an optical fiber contains a substance (hereinafter referred to as "Substance A") that generally monotonically decreases the optimal value of the refractive index profile exponential parameter $\alpha_{opt}$ in Equation (1) with an increase in wavelength and at least one substance (hereinafter referred to as "Substance B") that generally monotonically increases the optimal value of the refractive index profile exponential parameter $\alpha_{opt}$ with an increase in wavelength. The refractive index profile exponential parameter is optimized using the Wentzel-Kramers-Brillouin method (herein referred to as "WKB" method, see R. Olshansky and D. B. Keck, "Pulse Broadening in Graded-index Optical Fibers," Appl. Opt., vol. 15, pp. 483-491, 1976) so that a transmission bandwidth at an operating wavelength range is maximized.

$$n(r) = \begin{cases} n_1 \left[1 - 2\Delta\left(\frac{r}{a}\right)^\alpha\right]^{1/2} & (0 \leq r \leq a) \\ n_1(1 - 2\Delta)^{1/2} & (r > a) \end{cases} \quad (1)$$

where n(r) is a refractive index of the optical fiber at a distance "r" from the center 12 of the core 10, $n_1$ is a refractive index at the center 12 of the core 10, $\Delta$ is a relative refractive index difference of the center 12 of the core 10 with respect to the cladding 11, "a" is a core radius, and $\alpha$ is a refractive index profile exponential parameter. While the refractive index profile exponential parameters $\alpha$ are adjusted to values which provide a maximum transmission bandwidth at a desired wavelength, the optimal values $\alpha_{opt}$ thereof vary depending on the dopant doped into silica glass.

The refractive index profile of a multimode fiber that is represented by Formula (1) is shaped such that once the refractive index reaches the highest value at the center of the core, it gradually decreases with increasing distance from the center. Therefore, signal light propagating through the multimode fiber in a lower order mode travels a shorter distance but at a slower rate. In contrast, signal light propagating in a higher order mode travels a longer distance but at a higher rate near the boundary between the core and the cladding where the refractive index is smaller.

Accordingly, by properly selecting the value of a which determines the shape of the profile, the difference in arrival time until light signals at various modes propagating through the multimode fiber reach the output port can be minimized. Under the properly selected $\alpha$, the modal dispersion becomes the theoretical minimum, providing the maximum transmission bandwidth at the wavelength of signal light. On the other hand, the optimal value $\alpha_{opt}$ of $\alpha$ changes depending on the wavelength employed. Furthermore, this change is affected by the one or more dopants doped into the core and the concentration of the one of more dopants. When a single dopant is used, the dopant can be classified into two types: Substance A that generally monotonically decreases the optimal value $\alpha_{opt}$ of the refractive index profile exponential parameter $\alpha$ with an increase in wavelength and Substance B that generally monotonically increases the optimal value $\alpha_{opt}$ with an increase in wavelength. Germanium (Ge) is used as Substance A, and fluorine (F) is used as Substance B.

Furthermore, the range of the change in the optimal value $\alpha_{opt}$ of the multimode optical fiber is preferably 0.025 or less, and more preferably 0.01 or less within a desired wavelength range. If the range of the change in the optimal value $\alpha_{opt}$ exceeds 0.025, the transmission bandwidth varies significantly with a change in wavelength within the desired wavelength range.

Moreover, in the multimode optical fiber, a core radius "a" of the above-described Formula (1) is preferably no less than 10 µm and no more than 35 µm, and more preferably is no less than 20 µm and no more than 30 µm. If the core radius "a" is smaller than 10 µm, it becomes difficult to couple fibers or couple a fiber and a light source. On the other hand, if "a" is greater than 35 µm, too many modes are generated and the transmission bandwidth is reduced.

In addition, the relative refractive index difference at the center of the core with respect to the cladding $\Delta$ of the multimode optical fiber is expressed by the following equation: $\Delta = \Delta_1 + \Delta_2$, where $\Delta_1$ is a relative refractive index difference of Substance A (germanium) with respect to the cladding (i.e., $\Delta_1$ is $\Delta_{Ge}$), and $\Delta_2$ is a relative refractive index difference of Substance B (fluorine) with respect to the cladding (i.e., $\Delta_2$ is $\Delta_F$).

The relative refractive index difference $\Delta$ is selected by optimizing the values of $\Delta_1$ and $\Delta_2$ so that the desired refractive index profile and the optimal value $\alpha_{opt}$ satisfy the above-mentioned relationship.

The ratio of $\Delta_1$ to $\Delta_2$ ($\Delta_1/\Delta_2$) is preferably between 1/1 and 0/1, and more preferably is ¼. If $\Delta_1/\Delta_2$ is less than ¼, the optimal value $\alpha_{opt}$ monotonically increases in wavelength.

In contrast, if $\Delta_1/\Delta_2$ is greater than ¼, the optimal value $\alpha_{opt}$ monotonically decreases with an increase in wavelength.

Furthermore, Substance A (germanium) and Substance B (fluorine) are doped into the core so that $\Delta_1$ and $\Delta_2$ satisfy the above-mentioned relationship. More specifically, the concentration profile of the dopant that increases the refractive index is such that the concentration monotonically decreases toward the boundary between the core and the cladding with an increase in distance from the center of the core, and is zero at the boundary between the core and the cladding. In contrast, the concentration profile of the dopant that decreases the refractive index is such that the concentration is zero at the center of the core, and monotonically increases toward the boundary between the core and the cladding with an increase in distance from the center of the core.

The refractive index profile exponential parameter a of the multimode optical fiber of the above-described Formula (1) that represents the refractive index profile of this optical fiber is controlled to an optimal value, and the optimal value $\alpha_{opt}$ is approximately flat. In other words, the optimal value $\alpha_{opt}$ exhibits very little wavelength dependency, and the range of the change in the optimal value $\alpha_{opt}$ is very small in the entire wavelength range. Therefore, even if a multimode optical fiber in which the refractive index profile exponential parameter $\alpha$ is optimized at a certain wavelength such that the transmission bandwidth is maximized, a large transmission bandwidth is obtained in almost the entire wavelength range. For example, a multimode optical fiber of the present invention that contains fluorine in the core and is designed to have an optimal value of $\alpha$ in a shorter wavelength range so that the transmission bandwidth is maximized, has a far larger transmission bandwidth at a longer wavelength range than conventional germanium-doped multimode optical fibers.

A preform of the multimode fiber of the present invention is fabricated using a PCVD (plasma chemical vapor deposition) or MCVD (modified plasma chemical vapor deposition) method by doping the two dopants (germanium and fluorine), and precisely controlling the amount of the dopants so that a desired refractive index profile is obtained. The multimode fiber of the present invention is obtained by applying a high temperature to the resultant preform and drawing the preform.

The wavelength division multiplexing system 1 shown in FIG. 2 includes such a multimode optical fiber 2 as a transmission path and exhibits a high OFL bandwidth in a wide wavelength range. The wavelength division multiplexing system 1 has multiple channels that are defined by dividing the operational wavelength range with a certain wavelength spacing, and wavelength division multiplexing is enabled using those multiple channels.

Figure 3:
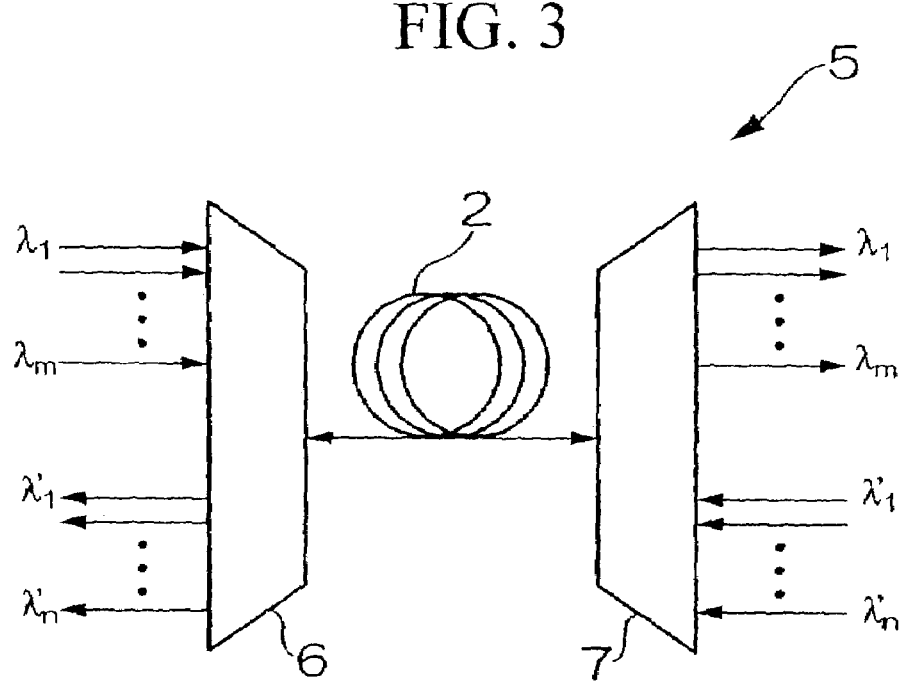
FIG. 3 is a schematic diagram of a bidirectional wavelength division multiplexing system, as another example of a wavelength division multiplexing system of the present invention.

FIG. 3 is a schematic diagram of a bidirectional wavelength division multiplexing system 5, as a second embodiment of the wavelength division multiplexing system according to the present invention. The bidirectional wavelength division multiplexing system 5 includes a first multiplexer/demultiplexer (MUX/DEMUX) 6 and a second multiplexer/demultiplexer (MUX/DEMUX) 7 that are coupled via the multimode optical fiber 2 so that a bidirectional wavelength division multiplexing is enabled.

Similar to the multimode optical fiber 2 used in the wavelength division multiplexing system 1 of the first embodiment, this multimode optical fiber 2 includes a core 10 made of silica-based glass that is codoped with germanium and fluorine and a cladding 11 made of silica glass or fluorine-doped silica glass that is disposed around the outer periphery of the core 10. The multimode optical fiber 2 exhibits a high OFL in a wide wavelength region so that a bandwidth wavelength division multiplexing is enabled, and preferably exhibits an OFL bandwidth of 1.5 GHz·km or higher, and more preferably an OFL bandwidth of 2.5 GHz·km or higher at a given channel within a wavelength region between 720 nm and 1400 nm.

In the bidirectional wavelength division multiplexing system 5, multiple channels are defined by dividing the operational wavelength range of the multimode optical fiber 2 with a certain wavelength spacing. These channels are divided into two groups, and a first group of channels with wavelengths $\lambda_1, \lambda_2, \ldots, \lambda_m$ is used for sending in one direction, and a second group of channels with wavelengths $\lambda'_1, \lambda'_2, \ldots, \lambda'_m$ is used for sending in the other direction to realize bidirectional wavelength division multiplexing.

EXAMPLES

Example 1

Figure 4:
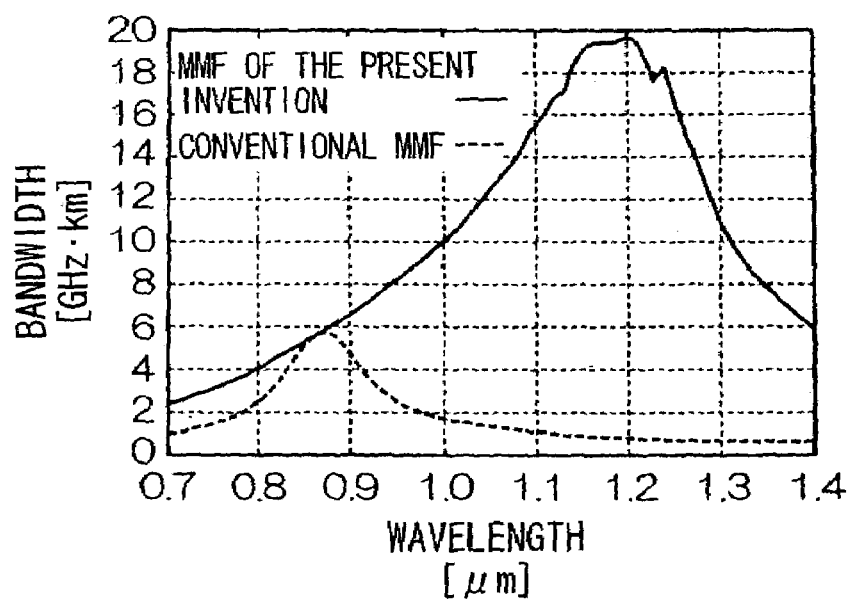
FIG. 4 is a graph of bandwidth versus wavelength of an exemplary MMF of the present invention and of a conventional MMF of Example 1.

A multi-mode fiber (MMF) of the present invention that is codoped with germanium (Ge) and fluorine (F) and has a maximum relative refractive index $\Delta$ of 0.01 ($\Delta$Ge=0.002 and $\Delta_F$=−0.008) and a core radius "a" of 25 µm was used. A conventional multi-mode fiber (MMF) that was optimized in a wavelength of 850 nm was used for comparison. The bandwidth characteristics of the MMF of the present invention and the conventional MMF were determined, and the results are shown in FIG. 4.

The bandwidth characteristics of the MMF of the present invention and the conventional MMF are shown in Table 1 for CWDM (coarse WDM) that employs 35 channels with $\lambda$ between 720 nm and 1400 nm and a wavelength spacing of 20 nm.

TABLE 1

| | Channel wavelength (nm) | | | | | | | | | | | | | | | | | |
|---|---|---|---|---|---|---|---|---|---|---|---|---|---|---|---|---|---|---|
| | 720 | 740 | 760 | 780 | 800 | 820 | 840 | 860 | 880 | 900 | 920 | 940 | 960 | 980 | 1000 | 1020 | 1040 | 1060 |
| Bandwidth of conventional MMF (GHz · km) | 1.1 | 1.3 | 1.5 | 1.9 | 2.4 | 3.1 | 4.2 | 5.4 | 5.6 | 4.6 | 3.5 | 2.8 | 2.3 | 1.9 | 1.7 | 1.5 | 1.3 | 1.2 |
| Bandwidth of MMF of the present invention (GHz · km) | 2.5 | 2.8 | 3.2 | 3.6 | 4.0 | 4.4 | 4.9 | 5.4 | 5.9 | 6.5 | 7.1 | 7.7 | 8.4 | 9.2 | 9.9 | 10.8 | 11.9 | 12.9 |

TABLE 1-continued

| | Channel wavelength (nm) | | | | | | | | | | | | | | | | |
| --- | --- | --- | --- | --- | --- | --- | --- | --- | --- | --- | --- | --- | --- | --- | --- | --- | --- |
| | 1080 | 1100 | 1120 | 1140 | 1160 | 1180 | 1200 | 1220 | 1240 | 1260 | 1280 | 1300 | 1320 | 1340 | 1360 | 1380 | 1400 |
| Bandwidth of conventional MMF (GHz · km) | 1.1 | 1.0 | 1.0 | 0.9 | 0.9 | 0.8 | 0.8 | 0.7 | 0.7 | 0.7 | 0.6 | 0.6 | 0.6 | 0.6 | 0.6 | 0.5 | 0.5 |
| Bandwidth of MMF of the present invention (GHz · km) | 14.2 | 15.6 | 16.8 | 18.2 | 19.4 | 19.5 | 19.7 | 18.8 | 18.2 | 15.5 | 13.2 | 10.9 | 9.4 | 8.3 | 7.4 | 6.5 | 5.9 |

All of the channels shown in Table 1 may not be used, and one or more desired channel may be selected according to requirement. For example, only 16 channels may be used by setting the wavelength spacing to 40 nm, or several specific channels may be selected. Furthermore, for a bidirectional transmission, shorter wavelength channels between 720 nm and 1000 nm among the channels listed in Table 1 may be used for sending in one direction, and longer wavelength channels between 1020 nm and 1400 nm may be used for sending in the other direction.

The results listed in Table 1 show that the MMF of the present invention having a maximum relative refractive index Δ of 0.01 can provide an OFL bandwidth of 2.5 GHz·km or higher at a given channel in a wavelength range between 720 nm and 1400 run.

Example 2

Figure 5:
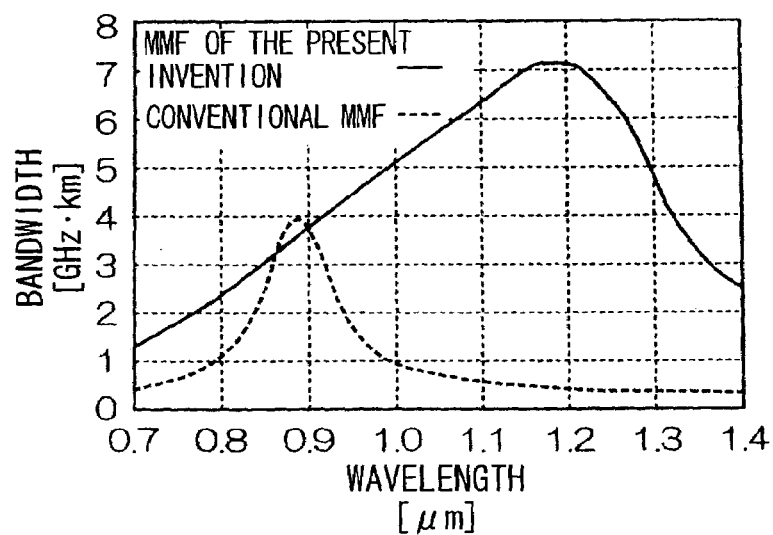
FIG. 5 is a graph of bandwidth versus wavelength of an exemplary MMF of the present invention and of a conventional MMF of Example 2.

An MMF of the present invention that is codoped with germanium (Ge) and fluorine (F) and has a maximum relative refractive index Δ of 0.02 ($\Delta_{Ge}$=0.004 and $\Delta_F$=0.016) and a core radius "a" of 32.5 μm were used. The conventional MMF that was optimized in a wavelength of 850 nm was used for comparison, which was the same MMF used in Example 1. The bandwidth characteristics of the MMF of the present invention and the conventional MMF were determined, and the results are shown in FIG. 5.

The bandwidth characteristics of the MMF of the present invention or the conventional MMF are shown in Table 2 for CWDM (coarse WDM) that employs 35 channels with λ between 720 nm and 1400 nm and a wavelength spacing of 20 nm.

All of the channels shown in Table 2 may not be used, and one or more desired channel may be selected according to requirement. For example, only 16 channels may be used by setting the wavelength spacing to 40 nm, or several specific channels may be selected. Furthermore, for a bidirectional transmission, shorter wavelength channels between 720 nm and 1000 nm among the channels listed in Table 1 may be used for sending in one direction, and longer wavelength channels between 1020 nm and 1400 nm may be used for sending in the other direction.

The results listed in Table 2 show that the MMF of the present invention having a maximum relative refractive index Δ of 0.02 can provide an OFL bandwidth of 1.5 GHz·km or higher at a given channel in a wavelength range between 720 nm and 1400 nm.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wavelength division multiplexing system comprising:
a wavelength division multiplexing transmission path comprising a multimode optical fiber that comprises a core and a cladding and is codoped with germanium and fluorine, wherein the multimode optical fiber pro-

TABLE 2

| | Channel wavelength (nm) | | | | | | | | | | | | | | | | |
| --- | --- | --- | --- | --- | --- | --- | --- | --- | --- | --- | --- | --- | --- | --- | --- | --- | --- |
| | 720 | 740 | 760 | 780 | 800 | 820 | 840 | 860 | 880 | 900 | 920 | 940 | 960 | 980 | 1000 | 1020 | 1040 | 1060 |
| Bandwidth of conventional MMF (GHz · km) | 0.5 | 0.6 | 0.7 | 0.9 | 1.1 | 1.5 | 2.1 | 3.1 | 3.9 | 3.7 | 2.7 | 1.9 | 1.4 | 1.1 | 1.0 | 0.8 | 0.7 | 0.7 |
| Bandwidth of MMF of the present invention (GHz · km) | 1.5 | 1.7 | 1.9 | 2.1 | 2.4 | 2.6 | 2.9 | 3.2 | 3.5 | 3.8 | 4.0 | 4.3 | 4.6 | 4.8 | 5.1 | 5.3 | 5.6 | 5.8 |

| | Channel wavelength (nm) | | | | | | | | | | | | | | | | |
| --- | --- | --- | --- | --- | --- | --- | --- | --- | --- | --- | --- | --- | --- | --- | --- | --- | --- |
| | 1080 | 1100 | 1120 | 1140 | 1160 | 1180 | 1200 | 1220 | 1240 | 1260 | 1280 | 1300 | 1320 | 1340 | 1360 | 1380 | 1400 |
| Bandwidth of conventional MMF (GHz · km) | 0.6 | 0.5 | 0.5 | 0.5 | 0.4 | 0.4 | 0.4 | 0.4 | 0.4 | 0.3 | 0.3 | 0.3 | 0.3 | 0.3 | 0.3 | 0.3 | 0.3 |
| Bandwidth of MMF of the present invention (GHz · km) | 6.0 | 6.3 | 6.6 | 6.8 | 7.0 | 7.1 | 7.1 | 7.0 | 6.6 | 6.2 | 5.7 | 4.8 | 4.0 | 3.4 | 3.1 | 2.7 | 2.5 | vides an overfilled-launch bandwidth of 1.5 GHz·km or higher for a signal transmitted therethrough at any wavelength between approximately 720 nm and approximately 1400 nm, and the multimode optical fiber has a refractive index profile as follows:

$$n(r) = \begin{cases} n_1\left[1 - 2\Delta\left(\frac{r}{a}\right)^\alpha\right]^{1/2} & (0 \le r \le a) \\ n_1(1 - 2\Delta)^{1/2} & (r > a) \end{cases}$$

where n(r) is a refractive index of the optical fiber at a distance "r" from a center of the core, $n_1$ is a refractive index at a center of the core, $\Delta$ is a relative refractive index difference of the center of the core with respect to the cladding, "a" is a core radius, and $\alpha$ is a refractive index profile exponential parameter, and $\Delta$ is $\Delta_1+\Delta_2$, and $\Delta_1/\Delta_2$ is between 1/1 and 0/1 or $\Delta_1/\Delta_2$ is ¼ (where $\Delta_1$ is a relative refractive index difference of germanium with respect to the cladding and $\Delta_2$ is a relative refractive index difference of fluorine with respect to the cladding).

2. The wavelength division multiplexing system according to claim 1, wherein the multimode optical fiber provides an overfilled-launch bandwidth of 2.5 GHz·km or higher for a signal transmitted therethrough at any wavelength between approximately 720 nm and approximately 1400 nm.

3. The wavelength division multiplexing system according to claim 1, further comprising:
a multiplexer; and
a demultiplexer,
wherein the multiplexer and the demultiplexer are coupled via the multimode optical fiber.

4. The wavelength division multiplexing system according to claim 1, further comprising:
a first multiplexer/demultiplexer; and
a second multiplexer/demultiplexer,
wherein the first multiplexer/demultiplexer and the second multiplexer/demultiplexer are coupled via the multimode optical fiber so that a bidirectional wavelength division multiplexing is enabled.

5. The wavelength division multiplexing system according to claim 1 used for coarse wavelength division multiplexing with a wavelength spacing of 20 nm or greater.

6. The wavelength division multiplexing system according to claim 1, wherein the multimode optical fiber has a maximum relative refractive index $\Delta$ of between 0.007 and 0.015, and a core radius of between 20 μm and 30 μm.

7. The wavelength division multiplexing system according to claim 1, wherein the multimode optical fiber has a maximum relative refractive index $\Delta$ of between 0.015 and 0.025, and a core radius of between 30 μm and 35 μm.

8. The wavelength division multiplexing system according to claim 1 wherein the multimode optical fiber provides an overfilled-launch bandwidth of 1.5 GHz·km or higher for a signal transmitted therethrough at any wavelength with a wavelength range of approximately 700 nm.

9. The wavelength division multiplexing system according to claim 1 wherein the multimode optical fiber provides an overfilled-launch bandwidth of 1.5 GHz·km or higher for a signal transmitted therethrough at any wavelength with a wavelength range of approximately 600 nm.

10. The wavelength division multiplexing system according to claim 1 wherein the multimode optical fiber provides an overfilled-launch bandwidth of 1.5 GHz·km or higher for a signal transmitted therethrough at any wavelength with a wavelength range of approximately 500 nm.

11. The wavelength division multiplexing system according to claim 1 wherein the multimode optical fiber provides an overfilled-launch bandwidth of 2.5 GHz·km or higher for a signal transmitted therethrough at any wavelength with a wavelength range of approximately 700 nm.

12. The wavelength division multiplexing system according to claim 1 wherein the multimode optical fiber provides an overfilled-launch bandwidth of 2.5 GHz·km or higher for a signal transmitted therethrough at any wavelength with a wavelength range of approximately 600 nm.

13. The wavelength division multiplexing system according to claim 1 wherein the multimode optical fiber provides an overfilled-launch bandwidth of 2.5 GHz·km or higher for a signal transmitted therethrough at any wavelength with a wavelength range of approximately 500 nm.

* * * * *